United States Patent [19]

Brown

[11] 4,190,299
[45] Feb. 26, 1980

[54] BUSHES

[75] Inventor: John E. Brown, Mansfield Woodhouse, England

[73] Assignee: West & Son (Engineers) Limited, Nottinghamshire, England

[21] Appl. No.: 910,146

[22] Filed: May 26, 1978

[30] Foreign Application Priority Data

May 27, 1977 [GB] United Kingdom ............... 22617/77

[51] Int. Cl.² .............................................. F16C 33/72
[52] U.S. Cl. ...................................... 308/3.5; 308/36.1
[58] Field of Search ............... 277/189, 235; 308/315, 308/36.1

[56] References Cited

U.S. PATENT DOCUMENTS 2,896,980  7/1959  Dicky ................................. 277/235

Primary Examiner—Robert I. Smith
Attorney, Agent, or Firm—Paul & Paul

[57] ABSTRACT

A rigid bushing is described suitable for reception on a shaft or in a bore which has formed at an axial end thereof an annular sealing formation which extends integrally from the end of the bushing angularly so as to form a sealing surface to engage either a shaft or a bore, sealing being accomplished by the application of axial pressure upon the bushing.

13 Claims, 4 Drawing Figures

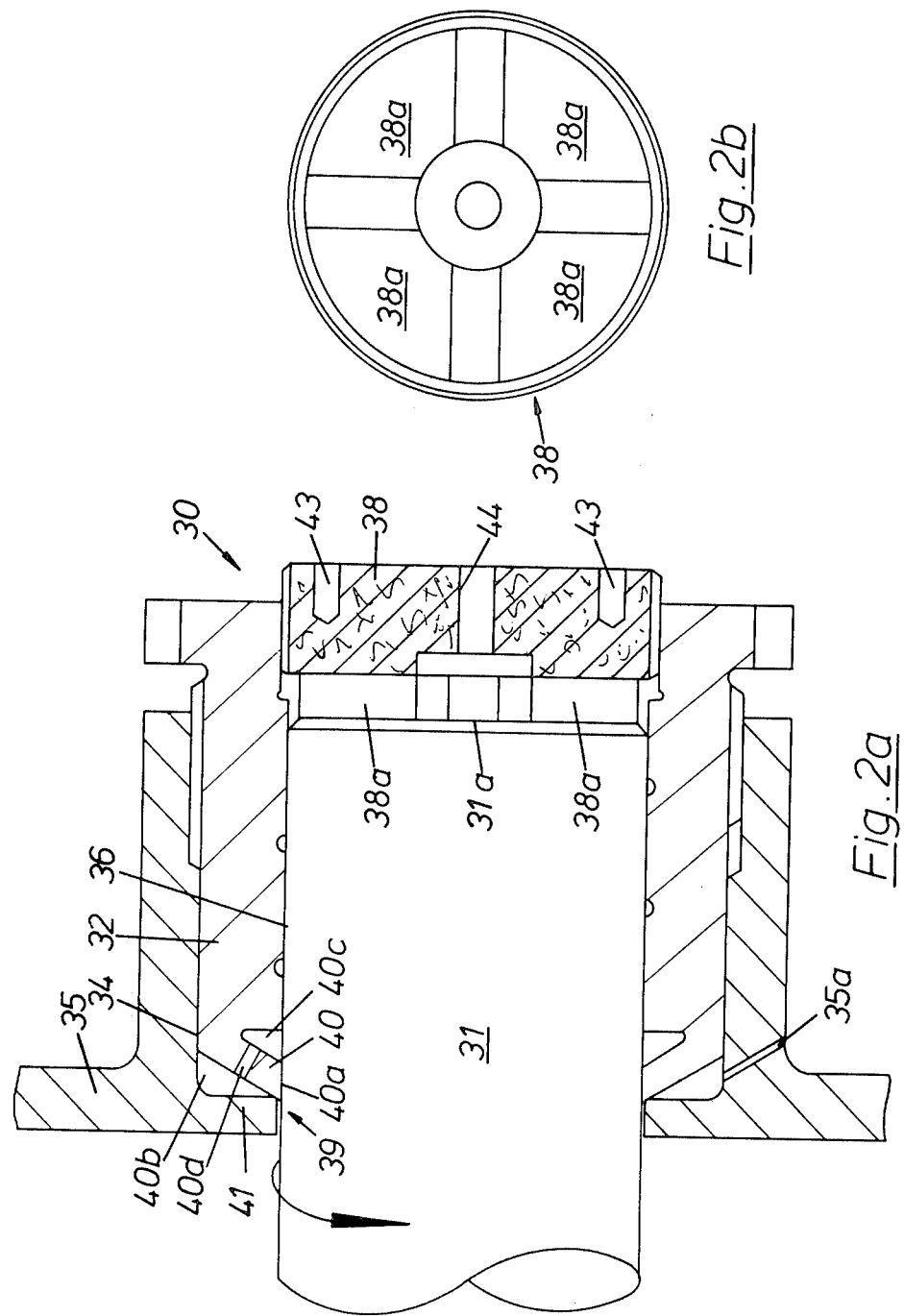

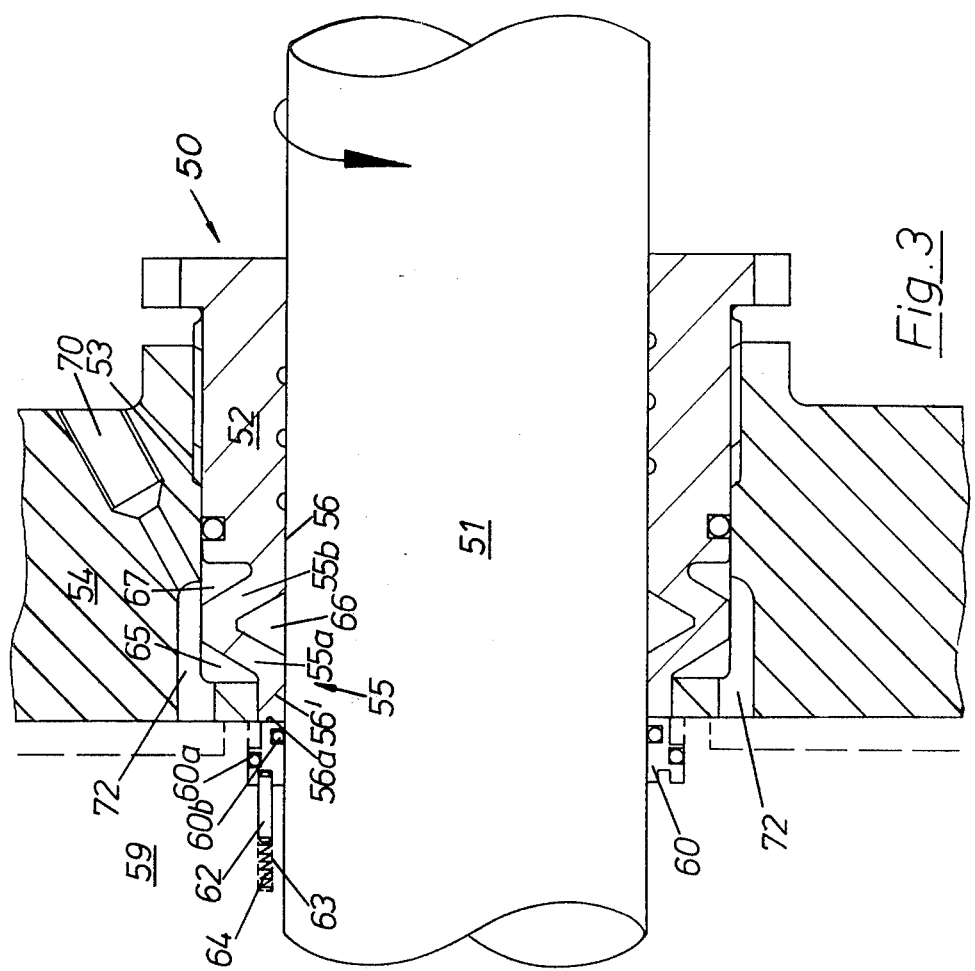

BUSHES

The present invention relates to bushes.

According to the present invention there is provided a bush for reception on a shaft or in bore and being capable of rotation relative to the shaft or bore, the bush having a body portion at least one axial end of which provided with an annular sealing formation, the axial cross-sectional shape of the or each formation, being such that upon axial compression the inner peripheral surfaces of the formation are caused to move radially inwardly or outwardly respectively.

The body of the bush may be made of any suitable material, for instance a plastics material preferably having a low co-efficient of friction. If desired, the material from which the body of the bush is made may be impregnated with a suitable lubricant.

Advantageously, the inner surface of the body which in use contacts the shaft, or the outer surface of the body which contacts the wall of the bore, is provided with at least one helically extending groove which enables lubricant e.g. grease, to be conveyed axially along the body of the bush.

The or each sealing formation is secured to the body of the bush and in one preferred form the body and the or each sealing formation is formed in one piece so that the or each formation is integrally formed with the body of the bush. The cross-sectional shape of the or each sealing formation may be any of those as disclosed in either U.K. Pat. Nos. 843,075, or 1,126898, or co-pending U.K. Pat. application No. 2924/77 or co-pending U.K. Pat. application filed on May 27, 1977 entitled "Seals".

Reference is now made to the accompanying drawings, in which:

FIG. 2a is an axial section of a second embodiment according to the present invention;

FIG. 2b is an end view of a thrust pad used in the second embodiment;

FIG. 3 is an axial section of a third embodiment according to the present invention.

Figure 1:
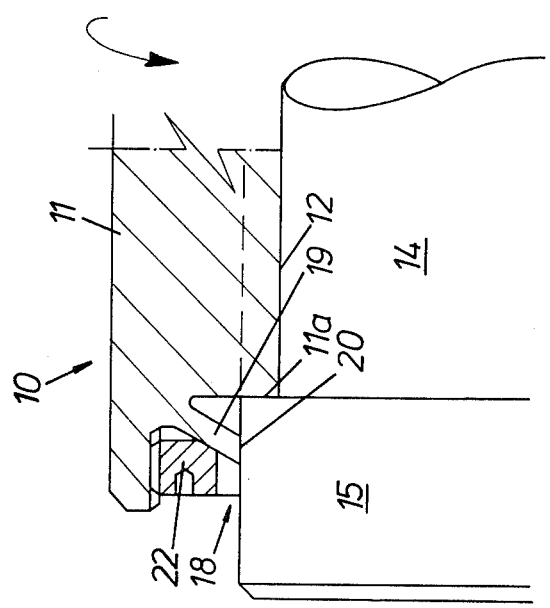
FIG. 1 is an axial section of a first embodiment according to the present invention.

In FIG. 1 a bush 10 according to the present invention is illustrated for use as a roller and includes an elongate generally cylindrical body 11 having a bore 12 extending axially therethrough. A shaft 14 is located in bore 12 and has an enlarged portion 15 at one end which abuts against end face 11a of body 11 and has an enlarged portion 16 at the other end which is threadedly received on the remainder of the shaft 14. The enlarged portion 16 abuts against end face 11b thus restraining axial movement of body 11 relative to shaft 14.

At each axial end of body 11 there is provided an annular sealing formation 18 each of which is defined by a radially inwardly directed annular flange 19 which is generally frusto conical in shape. The flange 19 has an inner peripheral face 20 which sealingly engages the outer peripheral surfaces of respective enlarged portions 15 and 16. Co-operating on each flange 19 is a compression ring 22 which is threadedly received in the body 11 and which is in abutment with the co-operating flange 19 so that on rotation of ring 22 relation to the body 11 the flange is placed under axial compression to urge face 20 into abutment with the associated enlarged portion to thus sealingly isolate the interior of the body 11 from the surrounding environment.

The above construction of roller, has been found to be particularly suitable for use with conveyors working in dust laden environments for instance with conveyors used for conveying coal as in coal mines or electricity generating power stations.

In FIG. 2a a second embodiment according to the present invention is generally illustrated at 30 and is illustrated for use in rotatably supporting an end of a shaft 31.

The bush includes a body portion 32 which is externally threaded to be threadedly received in a bore 34 formed in a casing wall 35. The body portion 32 is provided with an axially extending bore 36 which at one end of the body portion is internally threaded to receive a thrust pad 38. The opposite end of the body portion is provided with an annular sealing formation 39 defined by an annular flange 40 which is generally frusto conical in shape. The outer conical surface of flange 40 abuts against end wall 41 of bore 34 so that rotation of the body portion 32 within the bore 34 causes axial compression of flange 40 which serves to urge its inner peripheral surface 40a into sealing contact with the outer periphery of shaft 31.

The thrust pad 38 is provided with four raised segments 38a (as seen more clearly in FIG. 2b) which in use abut against the end face 31a of shaft 31. It will be appreciated that rotation of pad 38 within the body portion 32 varies the amount of axial loading applied to the shaft 31. The thrust pad 38 is conveniently locked in position by means of a detent (not shown) which is engagable with bores 43. Advantageously, the thrust pad 38 is provided with a central bore 44 through which a lubricant e.g. grease, may be introduced into the interior of the body portion 32. Conveniently, the surface of bore 36 is provided with at least one helically extending groove which enables the lubricant to pass axially along the shaft 31.

As shown in FIG. 2a, the flange 40 and end wall 41 define two annular spaces 40b and 40c. Advantageously, the flange 40 is provided with ducts 40d which provide communication between the spaces 40b and 40c so that air pressure and/or pressure exerted by the lubricant is equal in both spaces 40b, 40c. Additionally the casing is preferably provided with a vent duct 35a to prevent build up of excessive pressures in spaces 40b, 40c due to the insertion of grease into the bush.

The bush of FIG. 2a is particularly suitable for use in rotatably supporting shafts of machines or apparatus which operate in dust laden environments since the sealing formation serves to restrain inclusion of dust into the body portion 32 of the bush.

In FIG. 3, another embodiment is illustrated generally at 50 and is illustrated for use rotatably supporting the rotor shaft 51 of a centrifugal pump.

The bush 50 includes a body portion 52 which is externally threaded to be threadedly received in a bore 53 formed in the pump casing wall 54. The body portion 52 includes an axially extending bore 56 in which the rotor shaft 51 is received.

An annular sealing formation 55 is provided at one end of the body portion 52 and is generally "V" shaped in cross-section. The sealing formation 55 includes two legs 55a, 55b, the leg 55b being integrally connected to the body portion 52. The leg 55a is provided with an annular axially extending flange 56 which extends towards the rotor 59 of the pump. The rotor 59 is provided with a sealing ring 60 which is axially slidable on shaft 51 but is restrained from rotating relative thereto by a series of pins 62 circumferentially spaced about the shaft and received in bores 63. The bores 63 also contain springs 64 which resiliently bias the sealing ring 60 into sealing abutment with the end face 56a of flange 56.

The sealing ring 60 is provided with two O-rings, 60a, 60b which serve to prevent leakage of fluid along the shaft towards the sealing formation.

The sealing formation 55 defines three annular spaces 65, 66 and 67; annular spaces 65 and 67 being fed for cooling purposes from an external source with clean fluid through duct 70.

It will be appreciated that fluid supply to the annular spaces 65, 66 and 67 may be achieved in any of the ways described in co-pending U.K. Pat. application filed on May 27, 1977 entitled "Seals".

The fluid is discharged into the interior of the pump via fluid conduits 72. The bush illustrated in FIG. 3 is particularly suitable for use in application where a shaft is to be journalled and also sealed against escape of fluid.

In all of the embodiments described above the bush is conveniently moulded or machined from a suitable plastics material for instance: Polyamides, Nylon filled plastics, Nylatron G.S. (Registered Trade Mark) or Fluorsint (Registered Trade Mark).

What I claim is:

1. A bush for reception on a shaft, the bush having a body portion having an axially extending bore for rotatably receiving the shaft, an annular sealing formation located at at least one axial end of the body portion for sealingly engaging the shaft, the sealing formation including an annular wall inclined relative to the axis of the body portion so as to project in opposite axial directions, one axial end of the wall defining an annular sealing surface for sealingly engaging the shaft and the opposite axial end of the sealing formation being sealingly attached to the end of the body portion from which the sealing formation projects, the body portion and the or each sealing formation being formed from a rigid material so that on axial compression of the bush the wall of the or each sealing formation is deflected to urge its annular sealing surface into contact with the shaft.

2. A bush according to claim 1 wherein the body portion and the or each sealing formation are integrally formed from the same rigid material.

3. A bush according to claim 2, wherein the rigid material is a plastic material having a low co-efficient of friction.

4. A bush according to claim 3, wherein the plastics material is a polyamide or a polyimide.

5. A bush according to claim 1, wherein a sealing formation is integrally formed with one axial end of the body portion and a thrust pad is provided at the other end of the body portion for engagement with said body portion and the end of the shaft.

6. A bush according to claim 5, wherein the body portion sealing formation and thrust pad are formed of the same rigid material.

7. A bush according to claim 6 wherein the rigid material is a plastics material having a low co-efficient of friction.

8. A bush according to claim 7 wherein the plastics material is a polyamide or polyimide.

9. A bush according to claim 1 wherein the bore in the body portion is provided with at least one helically extending groove which enables lubricant to be conveyed axially along the body of the bush.

10. A bush for reception in a bore, the bush having a body portion of cylindrical shape, so configured that the body portion may be rotatably received in said bore, an annular sealing formation located at at least one axial end of the body portion for sealingly engaging the internal surface of the bore, the sealing formation including an annular wall inclined relative to the axis of the body portion so as to project in opposite axial directions, one axial end of the wall defining an annular sealing surface for sealingly engaging the internal surface of the bore, and the opposite axial end of the sealing formation being sealingly attached to the end of the body portion from which the sealing formation projects, the body portion and the or each sealing formation being formed from a rigid material so that on axial compression of the bush the wall of the or each sealing formation is deflected to urge its annular sealing surface into contact with the bore.

11. A bush according to claim 10, wherein the body of the bush and the or each sealing formation are integrally formed from the same rigid material.

12. A bush according to claim 11, wherein the rigid material is a plastics material having a low co-efficient of friction.

13. A bush according to claim 12, wherein the plastics material is a polyamide or polyimide.

* * * * *